A. W. WALKER.
COOKING STOVE AND RANGE.
APPLICATION FILED MAR. 25, 1912.

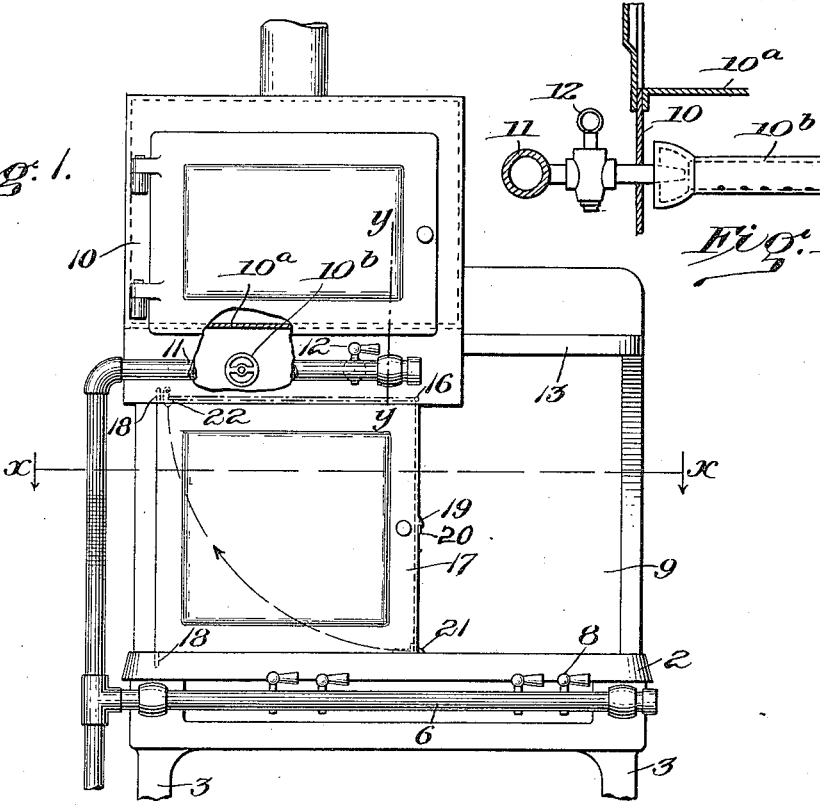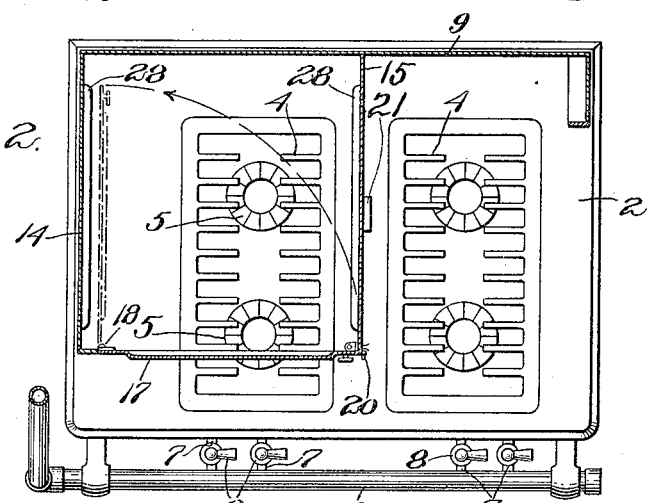

1,151,071.

Patented Aug. 24, 1915.
2 SHEETS—SHEET 2.

Witnesses:

Inventor:
Arthur W. Walker,
By E. D. Chadwick,
Attorney.

UNITED STATES PATENT OFFICE.

ARTHUR W. WALKER, OF MALDEN, MASSACHUSETTS.

COOKING STOVE AND RANGE.

1,151,071.  Specification of Letters Patent.  Patented Aug. 24, 1915.

Application filed March 25, 1912. Serial No. 685,919.

*To all whom it may concern:*

Be it known that I, ARTHUR W. WALKER, a citizen of the United States, residing at Malden, in the county of Middlesex and State of Massachusetts, have invented new and useful Improvements in Cooking Stoves and Ranges, of which the following is a specification.

This invention while applicable to a considerable variety of stoves and ranges, is particularly intended to be utilized in connection with gas-burning and oil-burning stoves, the object of the invention being to provide a stove construction having certain parts which may be readily arranged to form an oven adapted to be heated by the fuel burned in the stove, or collapsed and moved out of the way when not in use, when the space which it occupies will be available for other purposes.

My improvements are herein illustrated as applied to a gas stove of the so-called "cabinet" type, comprising a table with burners exposed through its top and a baking oven located above the table, and provide in connection with the parts commonly found in such a stove a supplementary oven or broiler located beneath the baking oven and adapted to be heated by the same burner or burners which heat said baking oven, with the parts of the supplementary oven so constructed and arranged that certain of them may be swung out of the way when it is desired to leave the entire top of the table exposed for use.

Figure 3:
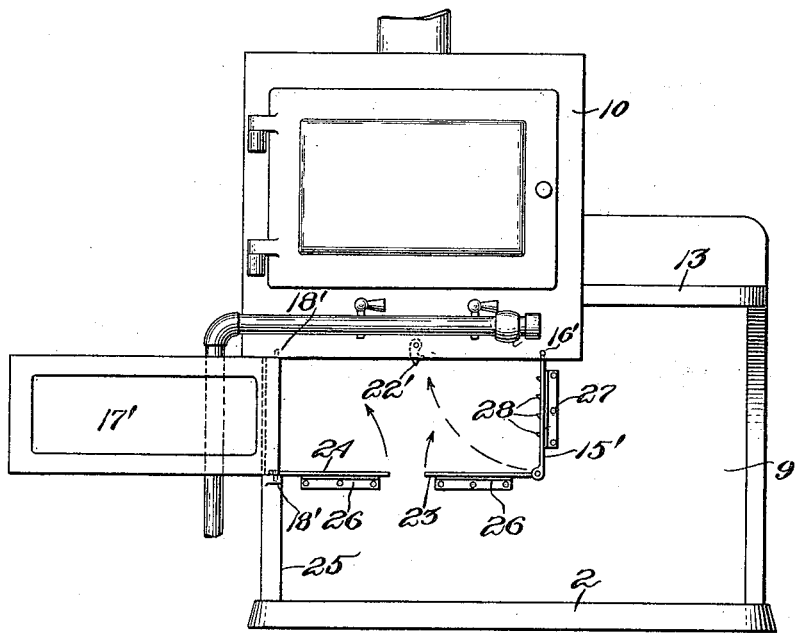

In the accompanying drawings: Figure 1 is a front elevation, partly broken away, of a stove of the character above described, having one form of my improvements embodied therein; Fig. 1ª is a section on the line *y—y* in Fig. 1; Fig. 2 is a horizontal section on the line *x—x* in Fig. 1, looking downward; Fig. 3 is a view similar to Fig. 1, illustrating another form of my improvements; and Fig. 4 is a front elevation of certain parts shown in Fig. 3, on a larger scale.

Referring first to Figs. 1 and 2 of the drawings, the stove therein illustrated comprises a table 2 supported by legs 3 and having its top provided with gratings 4 beneath which burners 5 of any suitable construction are located, these burners being provided with gas from a main supply pipe 6 having branches 7 each leading to one of the burners and controlled by a gas cock 8. From the rear of the table 2 an upright wall or back 9 extends upward and carries a baking oven 10 which has burners located beneath its bottom 10ª and exposed as viewed from below, one of said burners being shown at 10ᵇ in Fig. 1 and Fig. 1ª, and a supply pipe 11 leads to these burners, which are controlled by gas cocks 12. The back 9 is also shown as carrying a horizontal shelf 13 at one side of the oven 10, and as described thus far, the stove is of well known construction.

To the parts above referred to I add a vertical wall 14, which extends from the bottom of the baking oven 10 to the top of the table 2 at one end of the same, and also extends forward from the back 9 to a distance equal to the desired depth of the supplementary oven. This wall 14 may be fixed in position, as shown, since it is located at one end of the stove and does not interfere with the use of the top 2 and its burners 5, and it and the back 9 form respectively one side wall and the rear wall of the supplementary oven, the other side wall of which consists of a plate 15 so connected to the other parts of the stove that it may be swung out of the way or folded against one of the adjacent parts when the supplementary oven is not in use. This is preferably accomplished by suspending the plate 15 on pivots projecting from its front and rear edges at its upper end, with the front pivot 16 supported by the front of the baking oven 10 and the rear pivot (not shown) supported by the back 9, whereby said plate 15 may be swung upward on its pivots until it lies horizontally beneath the baking oven, as shown in dotted lines in Fig. 1. The supplementary oven is also provided with a door 17, preferably mounted on vertical pivots 18 at that edge which is adjacent to the fixed side wall 14, so that said door can be swung through an angle of 180°, or substantially so, and may thus be opened to give access to the interior of the supplementary oven, or swung inward to the position shown in dotted lines in Fig. 2, in which the door is located adjacent to and in substantial parallelism with said fixed wall 14. The door 17 is provided with suitable means for holding it closed, such as a catch 19 adapted to enter a notch in a bracket 20 secured to the front edge of the movable plate 15 and the top of the table 2, as shown in Fig. 1, is provided with a stop 21 located in position to prevent the lower edge of said plate 15 from swinging to the right beyond a perpendicular position. As thus constructed, by swinging the door 17 outward into open position and then swinging the plate 15 downward into a vertical position, as shown in Fig. 1, a supplementary oven is provided which is adapted to be used as a broiling oven and to receive its heat from the burners located at the bottom of the baking oven 10, said burners being exposed at the top of the supplementary oven. When it is not desired to use this oven, however, the plate 15 may be swung upward to a horizontal position beneath the baking oven 10, where it will form a supplemental bottom beneath the burners for this oven, and the door 17 may then be swung backward against the fixed wall 14, whereupon practically the entire top of the table 2 will be available for use and full access will be had to all of the burners 5 with which it is provided. The plate 15 may be held in its elevated position by causing it to rest upon the top edge of the door 17 after the latter has been swung backward as above described, but it is preferable to provide a special device for holding said plate 15 elevated, such a device being shown in Fig. 1 as consisting of a pivotally-suspended hook 22 adapted to swing under and engage the free edge of the plate.

Figure 4:
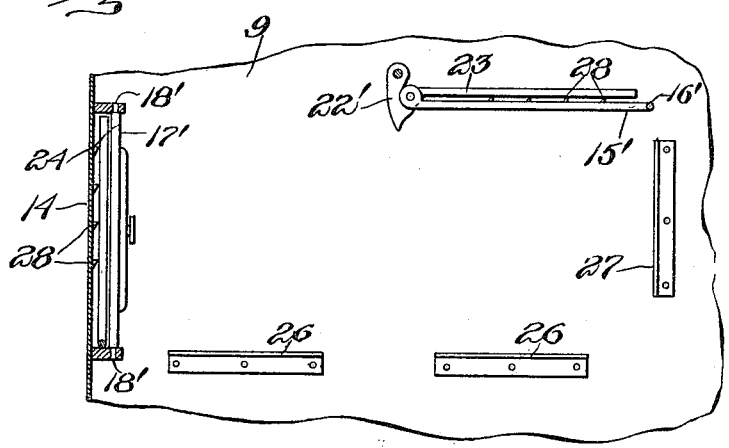

In Figs. 3 and 4 I have shown a somewhat modified construction, whereby a collapsible broiling oven is provided in substantially the same relation to the other parts of the stove as in Figs. 1 and 2, but without entirely obstructing any part of the table 2 even when the collapsible or supplementary oven is in use. According to this construction the back 9, the baking oven 10 with its burners and the vertical wall 14 are employed as in Figs. 1 and 2, but the movable side wall of the supplementary oven consists of a plate 15' pivotally suspended from its upper end and of such height that it extends only part of the way down to the table 2, and the bottom of the oven consists of two plates 23 and 24, of which the plate 23 is horizontally pivoted at one edge to the free edge of the plate 15', while the plate 24 is horizontally pivoted, opposite the plate 23 when lowered, on pivots mounted in the back wall 9 and in a vertical front strip 25, respectively. These plates 23 and 24 are of such size that they may be swung upward against the plate 15' and the wall 14 respectively, and after the plate 23 has been thus folded against the plate 15' these two plates together may be swung up beneath the bottom of the baking oven 10 and there held by suitable means such as a pivotally-suspended hook 22'. Horizontal ledges 26, secured to the back wall 9, serve to support the plates 23 and 24 in horizontal position when lowered, and a vertical ledge 27, also secured to the back wall 9, prevents the plate 15' from passing beyond a vertical position when swung downward, the parts being thus held in the position shown in Fig. 3 when in use. The supplementary oven is also provided with a door 17', arranged substantially as in Figs. 1 and 2 and of such length as to extend across the front of the oven, the dimensions of which are such that the door may be swung inward against the wall 14 when the oven is collapsed, that is to say, the depth of the oven is at least as great as the length of its door. Similarly, the length of the plates 23 and 24 will be determined by the height of the oven, whence it may result that an opening, as shown in Fig. 3, will be left between the edges of said plates when lowered, but this will not be a disadvantage or interfere with the operation of the oven, since gas-heated ovens are not required to be tight, and for the same reason no special care is required in fitting the parts together. Ledges 28, carried by the side walls of the oven on their inner faces, may be employed for supporting a removable shelf or shelves such as are commonly used in ovens.

While I have described my invention in connection with a gas stove of the cabinet type, it will be understood that my invention may be embodied in various other kinds of stoves, and that the collapsible or folding parts of the supplementary oven may be variously constructed and arranged, according to the location of the oven with reference to the other parts of the stove and the availability of the latter parts to serve as walls for said oven, and it will also be evident that the collapsible parts may be arranged to turn on pivotal axes or otherwise in whatever manner may be found convenient or expedient in a given case, without departing from the characteristic features of my invention or losing the advantages resulting therefrom.

I claim as my invention:—

1. A cooking stove comprising a main top portion and means for heating the same, fixed vertical walls extending upward from the rear side and one end of said top portion and adapted to form the rear wall and one side wall of a broiling oven, a pivotally-mounted wall arranged to move into position to form the other side wall of said oven or to be folded against one of the fixed parts of the oven to leave the space over said main top portion unoccupied, and one or more burners located at the top of the broiling oven in position to heat the same when set up.

2. A cooking stove comprising a fixed oven having one or more burners at its bottom and a supplementary oven located beneath said burner or burners and adapted to be heated thereby, said supplementary oven having a movable wall pivotally supported at its upper end and adapted to be swung upward beneath the fixed oven, and also having a door adapted to be swung outward or inward.

3. A cooking stove comprising a table provided with one or more top burners, a back extending upward from the rear side of said table, a fixed oven secured to said back and having one or more burners exposed beneath its bottom, and a supplementary oven located beneath the fixed oven and above the table and adapted to be heated by the burners at the bottom of said fixed oven, said supplementary oven having a fixed wall forming one of its sides and located at one end of the table, and also having a pivotally-mounted wall arranged to form its other side or to be folded into inoperative position to leave the space over the table unoccupied.

4. A cooking stove comprising a table provided with one or more top burners, a back extending upward therefrom, a fixed oven carried by said back and having one or more burners at its bottom, and a supplementary oven located between said fixed oven and table and having a pivotally-mounted wall and a door adapted to be folded against adjacent parts of the stove.

In testimony whereof, I have hereunto subscribed my name this twenty-third day of March, 1912.

ARTHUR W. WALKER.

Witnesses:
OLIVER R. MITCHELL,
E. D. CHADWICK.

Copies of this patent may be obtained for five cents each, by addressing the "Commissioner of Patents Washington, D. C."